United States Patent
Recktenwald et al.

(10) Patent No.: US 10,949,351 B2
(45) Date of Patent: *Mar. 16, 2021

(54) BITS REGISTER FOR SYNONYMS IN A MEMORY SYSTEM

(71) Applicant: International Business Machines Corporation, Armonk, NY (US)

(72) Inventors: Martin Recktenwald, Schoenaich (DE); Willm Hinrichs, Holzgerlingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/393,990

(22) Filed: Apr. 25, 2019

(65) Prior Publication Data

US 2019/0251030 A1    Aug. 15, 2019

Related U.S. Application Data

(63) Continuation of application No. 15/711,165, filed on Sep. 21, 2017, now Pat. No. 10,324,846.

(51) Int. Cl.
| | | |
|---|---|---|
| G06F 12/00 | (2006.01) |
| G06F 12/0817 | (2016.01) |
| G06F 12/10 | (2016.01) |
| G06F 12/0844 | (2016.01) |
| G06F 12/1045 | (2016.01) |
| G06F 13/00 | (2006.01) |
| G06F 12/0846 | (2016.01) |

(52) U.S. Cl.
CPC ...... *G06F 12/0828* (2013.01); *G06F 12/0844* (2013.01); *G06F 12/10* (2013.01); *G06F 12/1054* (2013.01); *G06F 12/1063* (2013.01); *G06F 12/0851* (2013.01); *G06F 2212/683* (2013.01)

(58) Field of Classification Search
CPC .. G06F 12/0828; G06F 12/10; G06F 12/0844; G06F 12/1063; G06F 12/1054; G06F 12/0851; G06F 2212/683
See application file for complete search history.

(56) References Cited

U.S. PATENT DOCUMENTS

| | | | |
|---|---|---|---|
| 6,598,128 B1 | 7/2003 | Yoshioka et al. |
| 8,041,894 B2 | 10/2011 | Krumm |

(Continued)

OTHER PUBLICATIONS

IBM Appendix P, list of patents and patent applications treated as related, dated Apr. 25, 2019. Two pages.

(Continued)

*Primary Examiner* — Mark A Giardino, Jr.
(74) *Attorney, Agent, or Firm* — Stephen R. Yoder

(57) ABSTRACT

In an approach to tracking and invalidating memory address synonyms in a memory system includes establishing a bits register for a first virtual address in a memory system, the bits register having synonym fields representing each bit of a first synonym identifier portion of the first virtual address, the first virtual address being mapped to a physical address; determining, for a second virtual address mapped to the physical address, the second virtual address having a second synonym identifier portion, a set of differing bits within the second synonym identifier portion compared to the first synonym identifier portion; and registering the set of differing bits in the bits register.

20 Claims, 5 Drawing Sheets

(56) References Cited

U.S. PATENT DOCUMENTS

| | | |
|---|---|---|
| 9,274,959 B2 | 3/2016 | Habermann |
| 9,772,943 B1 | 9/2017 | Mukherjee |
| 2003/0023814 A1 | 1/2003 | Barroso et al. |
| 2012/0324175 A1 | 12/2012 | Damodaran |
| 2014/0331013 A1 | 11/2014 | Ishii |
| 2015/0032964 A1 | 1/2015 | Habermann |
| 2016/0188486 A1 | 6/2016 | Sohi |
| 2016/0224471 A1 | 8/2016 | Avudaiyappan |
| 2016/0239431 A1 | 8/2016 | Li |
| 2019/0087338 A1 | 3/2019 | Recktenwald |
| 2019/0087339 A1 | 3/2019 | Recktenwald |

OTHER PUBLICATIONS

Yoon et al., Revisiting Virtual L1 caches: A Practical Design Using Dynamic Synonym Remapping, Apr. 4, 2016, IEEE, 2016 IEEE International Symposium on High Performance computer Architecture, pp. 212-224. (Year: 2016).

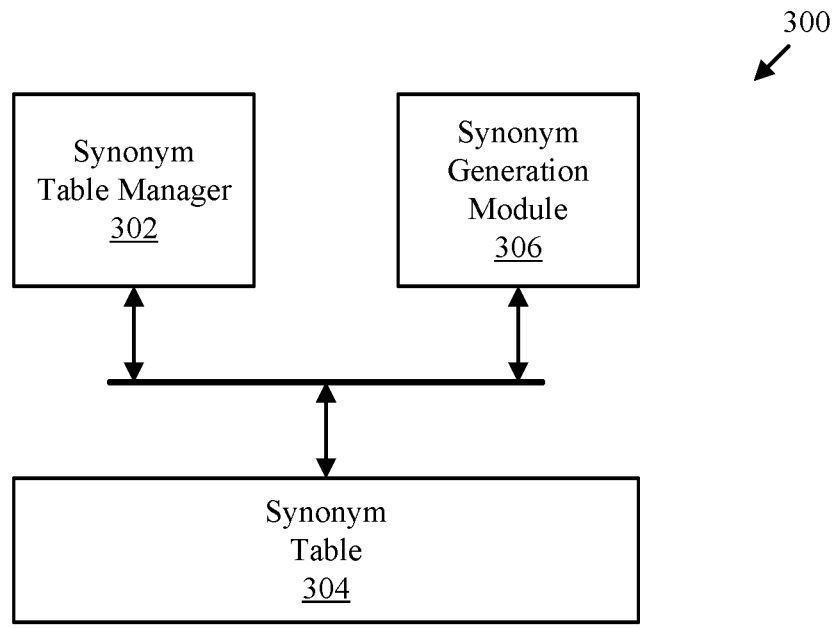
FIG. 3A
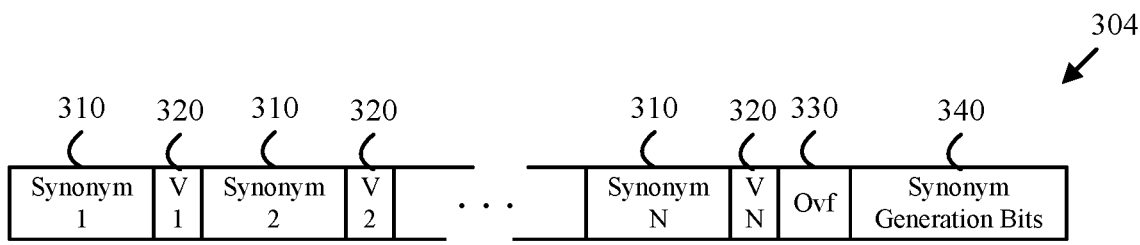
FIG. 3B
| Requested Synonym | Synonym 1 | V 1 | Synonym 2 | V 2 | Ovf | Synonym Gen. Bits | # Syn. | # Gen Bits | Max Syn. |
|---|---|---|---|---|---|---|---|---|---|
| 1 1 1 1 1 1 1 | 1 1 1 1 1 1 1 | 1 | ------- | 0 | 0 | 0 0 0 0 0 0 0 | 1 | 0 | 1 |
| 1 0 0 1 1 1 1 | 1 1 1 1 1 1 1 | 1 | 1 0 0 1 1 1 1 | 1 | 0 | 0 1 1 0 0 0 0 | 2 | 2 | 4 |
| 1 0 1 1 1 1 0 | 1 1 1 1 1 1 1 | 1 | 1 0 0 1 1 1 1 | 1 | 1 | 0 1 1 0 0 0 1 | 3 | 3 | 8 |
| 1 1 0 1 1 1 0 | 1 1 1 1 1 1 1 | 1 | 1 0 0 1 1 1 1 | 1 | 1 | 0 1 1 0 0 0 1 | 4 | 3 | 8 |
FIG. 4B

BITS REGISTER FOR SYNONYMS IN A MEMORY SYSTEM

BACKGROUND OF THE INVENTION

The present invention relates generally to cache memory management, and more particularly to managing synonyms in a cache memory system.

Virtual memory systems map virtual (i.e., logical) addresses to physical (i.e., absolute) addresses. In some cases, multiple virtual addresses may map to the same physical address. The multiple virtual addresses are known as synonymous virtual addresses and referred to as synonyms. In order to maintain cache coherency, it is typically necessary to know each synonymous virtual address of a particular physical address and to invalidate those synonyms in response to certain events such as a write operation to any of the synonymous virtual addresses.

SUMMARY

A method, computer program product, and computer system for tracking and invalidating memory address synonyms in a memory system includes establishing a bits register for a first virtual address in a memory system, the bits register having synonym fields representing each bit of a first synonym identifier portion of the first virtual address, the first virtual address being mapped to a physical address; determining, for a second virtual address mapped to the physical address, the second virtual address having a second synonym identifier portion, a set of differing bits within the second synonym identifier portion compared to the first synonym identifier portion; and registering the set of differing bits in the bits register.

BRIEF DESCRIPTION OF THE DRAWINGS

FIG. 3A is a block diagram depicting one example of a synonym management module in accordance with one or more embodiments of the present invention;

FIG. 3B is a block diagram depicting one example of a synonym table in accordance with one or more embodiments of the present invention;

FIG. 4B is a state table depicting one example of using one embodiment of the synonym table of FIG. 3B and the synonym management method of FIG. 4A.

DETAILED DESCRIPTION

The embodiments disclosed herein enable improved synonym management in a cache memory management system. It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

The embodiments disclosed herein recognize that synonyms need not be individually managed but may be managed as a group and that scaling the size of the group minimizes overhead associated with synonym management.

One of skill in the art will appreciate that within a processing system there may be a number of caches and cache levels. As used herein, the cache level that handles synonym resolution is referred to as the "resolving cache", while the lower-level cache(s) connected to it (and potentially holding multiple synonyms for an absolute address) are referred to as "synonym caches".

Figure 1:
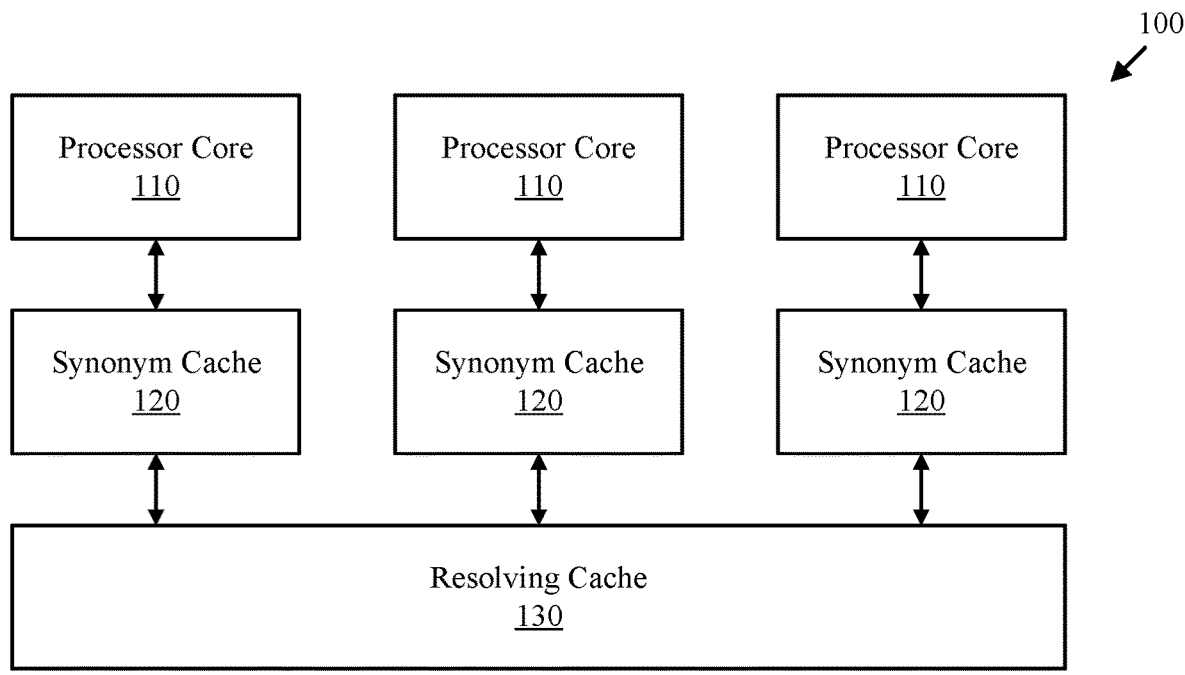
FIG. 1 is block diagram depicting one example of a processing system in accordance with one or more embodiments of the present invention.

FIG. 1 is block diagram depicting one example of a processing system 100 in accordance with one or more embodiments of the present invention. As depicted, the processing system 100 includes one or more processor cores 110 each coupled to a synonym cache 120. Each synonym cache 120 is also coupled to a resolving cache 130. In the depicted embodiment, the synonym caches 120 are all coupled to a shared resolving cache 130.

Figure 2A:
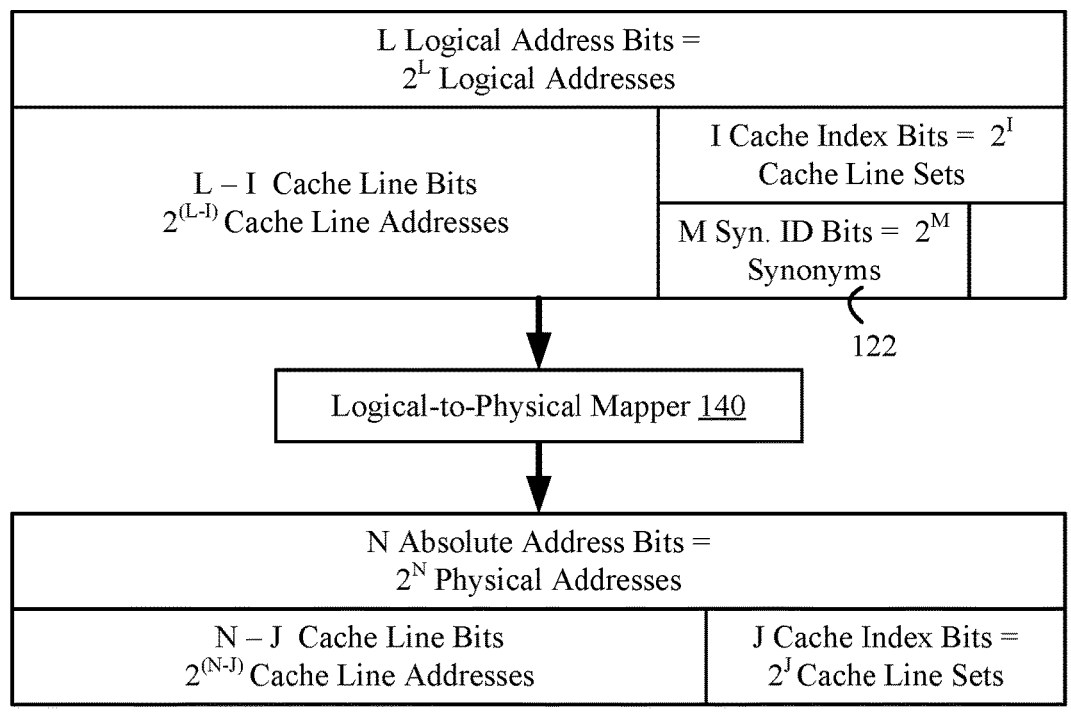
FIG. 2A is a block diagram depicting one example of a bit allocation scheme for cache addresses in accordance with one or more embodiments of the present invention.

FIG. 2A is a block diagram depicting one example of a bit allocation scheme for cache addresses in accordance with one or more embodiments of the present invention. A processing system such as the processing system 100 may use L logical address bits. As shown in FIG. 2A, the synonym caches 120 may use at least some logical address bits (e.g., I bits) for indexing into one or more cache directories 124. The resolving cache 130 uses some or all of the remaining (e.g., L–I) bits as an address (e.g., page address) for indexing into cache memory. A logical-to-physical mapper 140 may be used to translate logical addresses to absolute or physical addresses.

A portion of the indexing bits (e.g., M bits) may be used as synonym index bits 122. When a resolving cache such as the resolving cache 130 is addressed, the synonym address bits 122 may be used to identify synonyms of physical addresses. In the depicted embodiment, M address bits are used to identify up to $2^M$ synonyms for a selected physical address. Some or all of remaining N–I non-indexing address bits are used to identify up to $2^{N-I}$ physical addresses. For example, in one embodiment L is equal to 56, I is equal to 11, M is equal to 7 and N is equal to 47, resulting in $2^{47}$ physical addresses and 128 possible synonyms for each selected physical address.

As an example of how synonyms could be used, each processing core 110 could run one or more operating systems that use one or more shared libraries. For security and/or other reasons, each shared library may be mapped to a different virtual address on each core, or to multiple different virtual addresses on the same core.

Figure 2B:
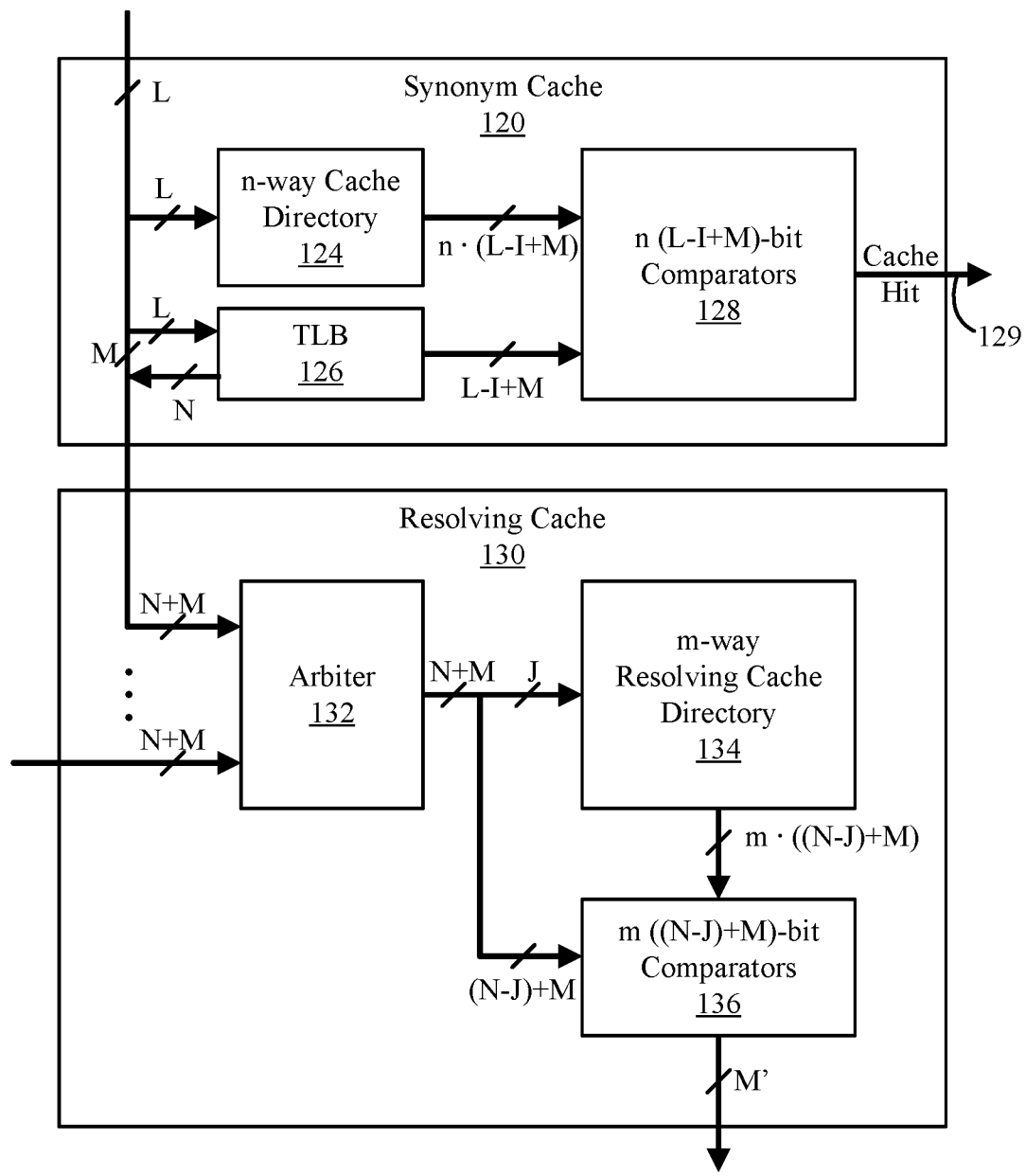
FIG. 2B is block diagram depicting additional details of one example of the processing system of FIG. 1 in accordance with one or more embodiments of the present invention.

FIG. 2B is block diagram depicting additional details of one particular example of the processing system of FIG. 1 in accordance with one or more embodiments of the present invention. The depicted embodiment is exemplary and not prescriptive. As depicted, additional exemplary details of the synonym cache 120 include a cache directory 124, a translation lookaside buffer (TLB) 126, and a comparator set 128. Additional exemplary details of the depicted resolving cache 130 include an arbiter 132, a resolving cache directory 134, and comparators 136.

The depicted cache directory 124 is a logically indexed, absolute tagged cache directory. It stores information corresponding to logical addresses such as absolute addresses, protection information, and cache state information. In the depicted embodiment, the cache is an n-way set associative cache that provides n instances of tag information plus potentially other data with each cache lookup operation. The logical address L may include index bits (I) that are used as an index (i.e., address) into the cache directory 124. Some or all of the index bits may be used as a synonym identifier which in the depicted embodiment is M bits. The n instances of the directory tag are compared with the absolute address provided by the translation lookaside buffer (TLB) 126 via a comparator set 128. In the depicted embodiment, the comparator set 128 includes n comparators that compare the n instances of the L−I+M bit wide absolute address tag with the addressing information provided by the TLB. If the addressing information provided by the TLB matches one of the n instances of the addressing information provided by the cache directory 124, a cache hit signal 129 is activated.

In the depicted embodiment, additional details of the resolving cache 130 include an arbiter 132, a resolving cache directory 134, and comparators 136. The arbiter 132 may arbitrate between multiple functional units that can access the resolving cache directory 134 including multiple instances of the synonym cache 120. A cache index portion of the absolute address (e.g., J of N bits) provided by the selected functional unit is presented to the resolving cache directory 134. The comparators 136 compare the remaining portion of the absolute address (e.g., N−J bits) and the synonym identifier (e.g., M bits) selected by the arbiter 132 with multiple instances of such addresses provided by the resolving cache directory 134. In the depicted embodiment, for example, the resolving cache directory 134 provides m instances of the non-index absolute address bits (i.e., N−J bits) along with corresponding payload information, including an M-bit synonym identifier, for each of the m instances. If any of the m instances of the remaining portion of the absolute address and the corresponding synonym identifiers match the addressing information selected by the arbiter 132, one of the m cache hit signals provided by the comparators 136 is activated.

FIG. 3A is a block diagram depicting one example of a synonym management module 300 in accordance with one or more embodiments of the present invention. As depicted, the synonym management module 300 includes a synonym table manager 302, a synonym table 304, and a synonym generation module 306. The synonym management module 300 may be associated with a resolving cache 130. In some embodiments, the managed synonyms are read-only synonyms for caches that map to a resolving cache 130.

The synonym table manager 302 manages adding and invalidating synonyms to the synonym table 304. The synonym table manager 302 may provide a consistent interface to the synonym table 304 to other functional units while hiding the internal structural details of the synonym table 304. The synonym table 304 stores the information necessary to track allocated synonyms. See the description of FIG. 3B for additional details on one embodiment of the synonym table 304.

In conjunction with invalidation operations, the synonym table manager 302 may access the synonym generation module 306 to determine each of the synonyms that must be evaluated. The synonym generation module 306 may be configured to generate all currently activated synonyms represented in the synonym table 304. The synonyms may be generated in response to an invalidation request. In one embodiment, the synonym generation module is implemented as interrupt driven software. In some embodiments, invalidation of a physical address is detected by a synonym cache 120 and communicated to the resolving cache 130 which triggers the invalidation of all synonymous virtual addresses associated therewith via the synonym generation module 306.

FIG. 3B is a block diagram depicting one example of a synonym table in accordance with one or more embodiments of the present invention. The depicted synonym table is one example of the synonym table 304 depicted in FIG. 3A. As depicted, the synonym table includes one or more synonym value registers 310 and corresponding valid entry flags 320, an overflow flag 330, and a synonym generation bits register 340. In one embodiment, a synonym table is included in a processing system for each supported instance of synonymous virtual addresses that have a common physical address.

The synonym value registers 310 indicate the first n synonyms that are used in a cache memory for a particular physical address. The valid entry flags 320 indicate whether a corresponding register 310 contains a valid synonym address. The synonym generation (or difference) bits register 340 indicate which bits are not identical for all of the synonyms that are allocated for a physical address.

Figure 4A:
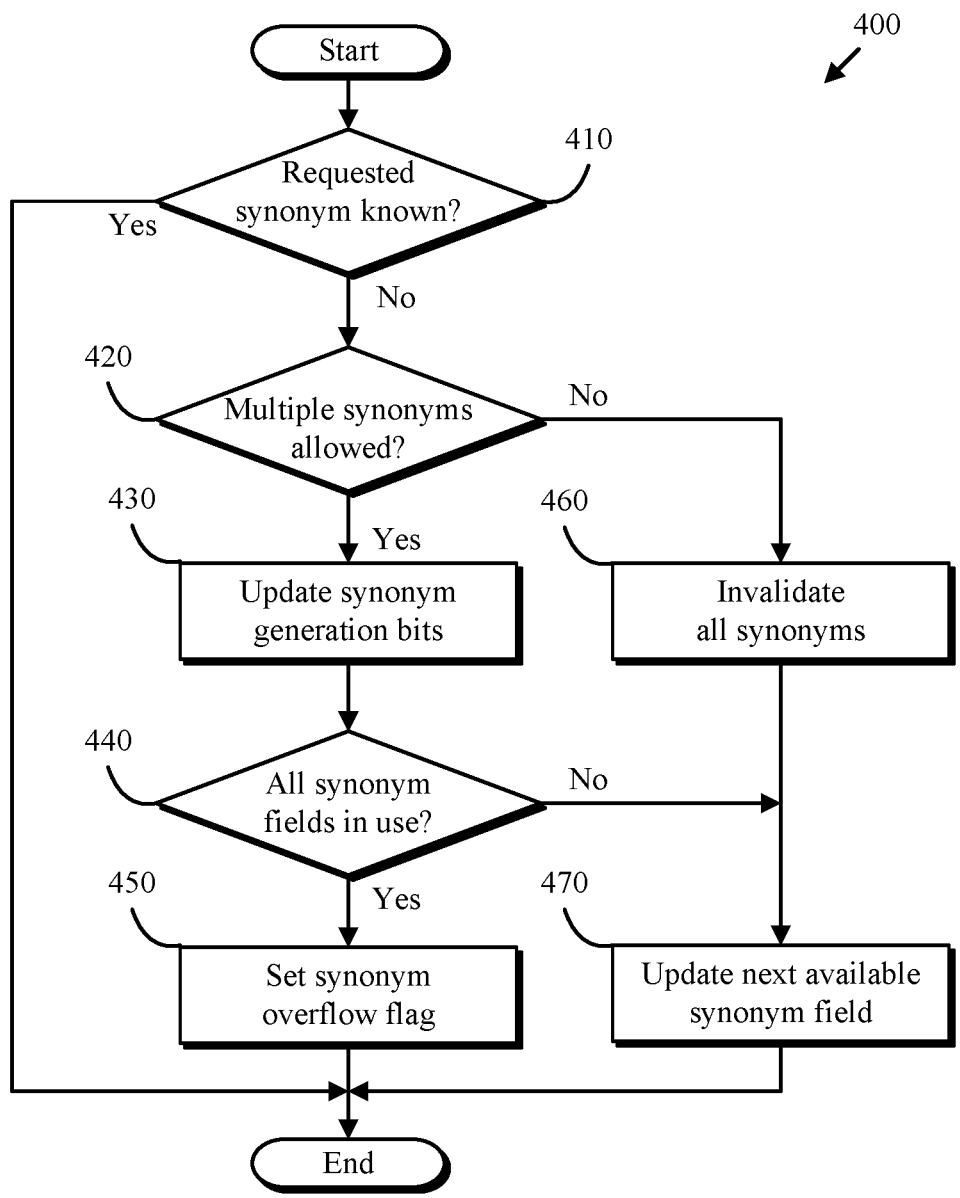
FIG. 4A is a flowchart diagram depicting one example of a synonym management method in accordance with one or more embodiments the present invention.

FIG. 4A is a flowchart diagram depicting one example of a synonym management method 400 in accordance with one or more embodiments the present invention. As depicted, the synonym management method 400 includes determining (410) whether a requested synonym is known, determining (420) whether multiple synonyms are allowed, updating (430) the synonym generation bits, determining (440) whether all synonym fields are in use, setting (450) a synonym overflow flag, invalidating (460) all synonyms and updating (470) a next available synonym. The depicted synonym management method 400 enables updating synonym-related directory entries and may be conducted in conjunction with the synonym management module 300 in response to a fetch request to the resolving cache 130 from a synonym cache 120.

Determining (410) whether a requested synonym is known may include determining whether the requested synonym is already accounted for by the synonym management module 300. In one embodiment, the requested synonym is XOR'ed with any of the synonym value registers to provide a bitwise difference and the bitwise difference is AND'ed with the bitwise complement of the synonym generation bits. If the result is zero, the requested synonym is already accounted for and the method exits. If the result is non-zero, the requested synonym is not already allocated/known and the method continues by determining 420 whether multiple synonyms are allowed.

Determining (420) whether multiple synonyms are allowed may include determining the type of fetch request (e.g., "read only", "exclusive") that was initiated. If the fetch request type does not support multiple synonyms, the method advances by invalidating (460) all synonyms. A typical case is an "exclusively" fetched cache line, which data can be modified in the synonym cache (120) by sending stores from the processor core (110). In order to keep cache line data coherent in the cache system, all previously fetched synonyms need to be invalidated.

If the fetch request type supports multiple synonyms, the method continues by updating (430) the synonym generation bits. A typical case is a "read-only" cache line that is fetched by multiple virtual addresses, which are allowed to point to the same absolute address, e.g. if software shares cache lines between different programs, such as is the case with shared libraries.

Updating (430) the synonym generation bits may include ORing the bitwise difference of the requested synonym XOR'd and any of the synonym value registers with the synonym generation bits. In one embodiment, the bitwise difference calculated in the determining operation 410 is reused and OR'd with the synonym generation bits.

Determining (440) whether all synonym fields are in use may include determining whether the valid entry flag corresponding to the last synonym value register is set. If not all of the synonym fields are in use, the method advances to step 470. If all synonym fields are in use (i.e., all of the synonym registers are filled with valid data), the method continues by setting (450) the synonym overflow flag 330.

Invalidating (460) all synonyms (for a particular physical address) may include clearing the valid entry flags 320 and the synonym generation bits 340. Previous to, or in conjunction with, conducting the invalidating step 460, the synonym generation bits 340 may be used to generate each possible synonym represented by the bits that are set. In some embodiments, each possible synonym is presented to a corresponding synonym cache 120 to facilitate invalidation of each synonym. Updating (470) a next available synonym may include storing the requested synonym in a synonym value register 310 and setting the corresponding valid entry flag 320.

One of skill in the art will appreciate that invalidation of all synonyms is necessary in certain situations such as a cross-invalidation request, replacing and invalidating a least-recently-used (LRU) cache line in the resolving cache, or when receiving a fetch request from the synonym cache that indicates that multiple copies of the cache line are not allowed (e.g., step 460 in FIG. 4A).

FIG. 4B is a state table depicting one example of using one embodiment of the synonym table 304 of FIG. 3B in conjunction with one embodiment of the synonym management method 400 of FIG. 4A. The synonym generation bits 340 and the synonym value registers 310 may include as many bits wide as needed to index into the synonym cache's directories. In the depicted example, 7 bits are used for each synonym value and two synonym values can be stored directly in the synonym value registers 310.

The synonym generation bits are continually updated to indicate which bits in the synonym address range are currently being used for read-only synonyms in the connected lower-level caches, i.e., those synonym bits which vary for the synonyms that are currently allocated/used. In the example depicted in FIG. 4B, the first requested synonym having a binary value of '1111111' is stored in the first synonym value register 310A and is known by the resolving cache. The second synonym value register 310B and corresponding synonym valid flag 320B may have previously been cleared along with the synonym generation bits 340. In response to an invalidation of a physical address, the resolving cache 130 can access the state table, determine that the synonym having a binary value of '1111111' is the only known synonym associated with the physical address and can send an invalidation request for this explicit synonym to a synonym cache 120.

In response to a second request to allocate a synonym, a second synonym having a binary value of '1001111' is stored in the second synonym value register 310B. A bitwise XOR of the first and second synonyms yields a binary value of '0110000' which is OR'd into the synonym generation bits 340 to yield a binary value of '0110000'. Consequently, according to the state of the synonym table 304, two synonyms with synonym values "1111111" and "1001111" are known by the resolving cache. In case of an invalidation event, the resolving cache can send the invalidation request for these two explicit synonyms to the synonym cache.

In response to a third request, a third synonym having a binary value of '1011110' is bitwise XOR'd with one of the synonym value fields. If XOR'd with the first synonym value or the second synonym value the binary result is '0100001' or '0010001', respectively. When the result is OR'd into the synonym generation bits 340, the resulting value is '0110001' in either case. Since the third synonym value '1011110' cannot be explicitly stored in the synonym table, the overflow bit 330 is set. According to the state of the synonym table 304, there are three synonym generation bits 340 in which all the fetched synonyms differ. While the specific values of all of the fetched synonyms are not known (e.g., by the resolving cache) it is known that all fetched synonyms are included in the set of 8 (i.e., 2^3) synonyms that can be generated from the synonym generation bits 340. In case of an invalidation event, the resolving cache 130 can send an invalidation request for the set of 8 synonyms to a synonym cache 120.

In response to a fourth request, a fourth synonym having a binary value of '1101110' is bitwise XOR'd with one of the synonym value fields. If XOR'd with the first synonym value or the second synonym value the binary result is '0010001' or '0100001', respectively. When the result is OR'd into the synonym generation bits 340, the resulting value is still '0110001' in either case. Consequently, in case of an invalidation event, the resolving cache 130 can send an invalidation request for the same set of 8 synonyms to a synonym cache 120 as would occur with the previous state of the synonym table 304.

One of skill in the art will appreciated that the number of supported synonyms is equal to 2 raised to the number of bits that are set (i.e., equal to '1') in the synonym generation bits. For example, using 2 bits supports 4 different synonyms while 3 bits supports 8 different synonyms. One of skill in the art will also appreciate that the growth rate in synonym support can scale in an orderly manner by requesting synonyms in a counting order such as '0000000', '0000001', '0000010', '0000011, '0000100, '0000101', '00000110, '0000111', '0001000', and so forth. However, for security purposes a random order may be desirable and the invention is not limited to a counting order. In some embodiments, a Johnson counter or the like is used to generate synonyms in a pseudo-random order. Using a pseudo-random order may provide orderly growth while maintaining security.

The described synonym tracking mechanism scales with the number of synonyms actually used by software. While some prior art solutions support a small, fixed number of synonyms or support an arbitrary number of synonyms at the cost of a large performance hit, with the present invention performance degrades slowly with the number of actively used synonyms at low additional hardware cost. Software that uses synonyms can actually decide how much of a performance hit to take by controlling the number of used synonym bits during address space randomization.

In an optimized version of the invention for implementations that support at least two synonym fields, the synonym generation bits 340 are not actually stored in a separate field in the synonym cache's directory. Instead, one of the synonym fields is pre-determined to take the value of the synonym generation bits 340 as soon as a synonym overflow happens. This works because the synonym generation bits can still be calculated from the synonym fields at the time where the overflow occurs. Besides sharing the hardware resources in the resolving cache's directory, this also enables sharing the invalidation request busses between the synonym cache 120 and resolving cache 130. For example, an implementation with two synonym fields might naturally have two busses to send two synonym addresses in parallel for one invalidation request. One of those could be used to transfer the synonym generation bits, and just an additional one-bit indication or modified invalidation command would be required to indicate this to the synonym cache. In such an implementation, the process of stepping through the synonyms to be invalidated could be done by the synonym cache.

Figure 5:
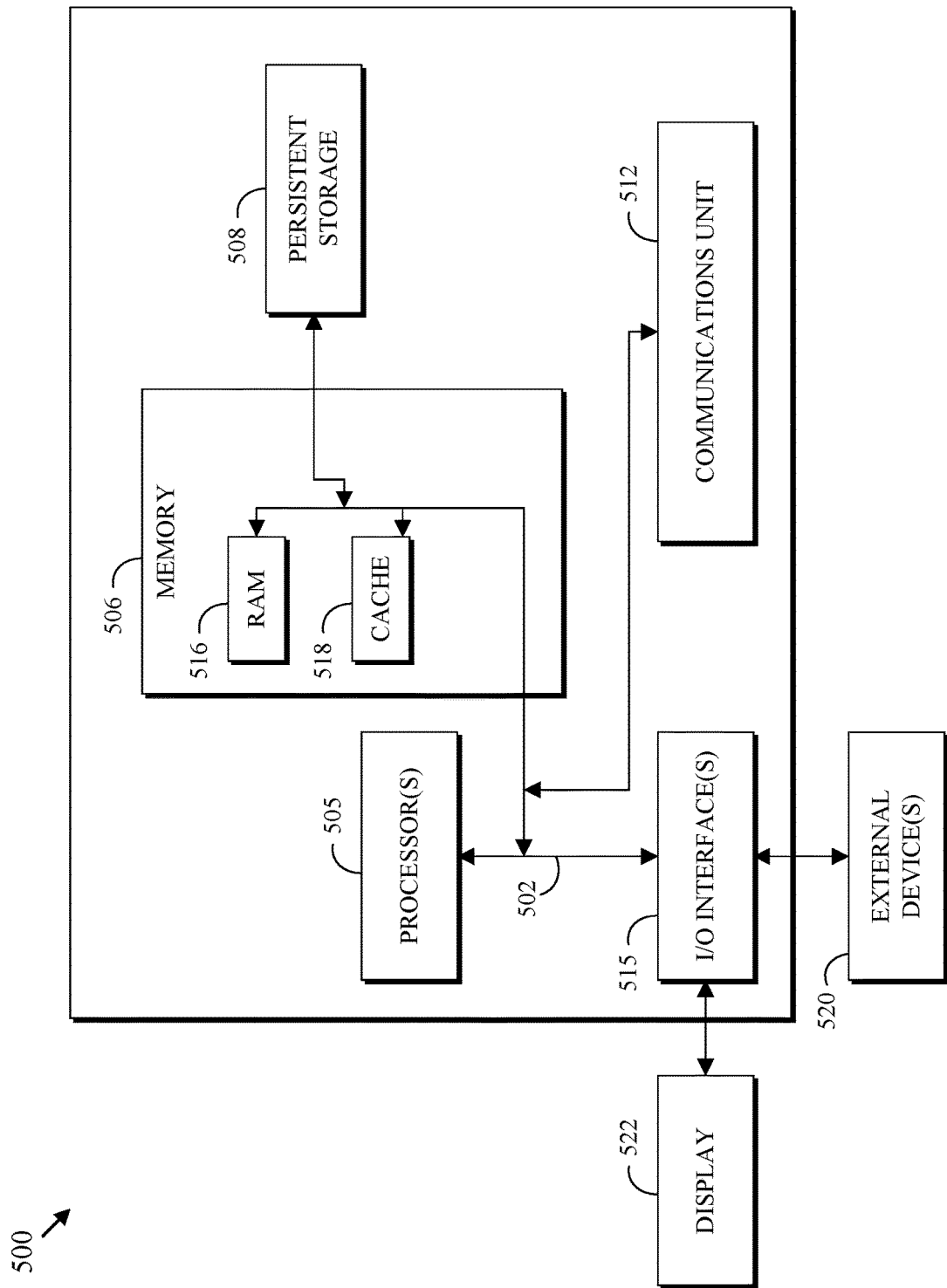
FIG. 5 is a block diagram depicting one example of a computing apparatus (i.e., computer) suitable for executing the methods disclosed herein.

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for managing memory address synonyms, the method comprising:
   establishing a bits register for a first virtual address in a memory system, the bits register having synonym fields representing each bit of a first synonym identifier portion of the first virtual address, the first virtual address being mapped to a physical address;
   determining, for a second virtual address mapped to the physical address, the second virtual address having a second synonym identifier portion, a set of differing bits within the second synonym identifier portion compared to the first synonym identifier portion; and
   registering the set of differing bits in the bits register.

2. The method of claim 1, further comprising:
receiving a fetch request excluding synonyms from mapping to the physical address; and
generating a set of synonyms within the memory system based on the bits register.

3. The method of claim 2, further comprising invalidating the set of synonyms within the memory system.

4. The method of claim 2, wherein generating the set of synonyms comprises generating each binary combination represented by the bits register.

5. The method of claim 1, further comprising recording the first synonym identifier portion in a first synonym identifier field and the second synonym identifier portion in a second synonym identifier field of a synonym table.

6. The method of claim 5, wherein the synonym table includes a limited number of synonym identifier fields.

7. The method of claim 6, further comprising determining that each of the synonym identifier fields of the synonym table contains a respectively corresponding synonym identifier portion.

8. The method of claim 7, further comprising:
responsive to determining that each of the synonym identifier fields of the synonym table contains a respectively corresponding synonym identifier portion, setting an overflow bit in the synonym table.

9. The method of claim 6, wherein the selected number of synonym identifier portions stored directly in the synonym table is less than or equal to four.

10. The method of claim 5, further comprising:
determining a next available synonym identifier field entry in of the synonym table, the next available synonym identifier field not containing a synonym identifier portion; and
recording a third synonym identifier portion associated with a third virtual address mapped to the physical address in the next available synonym identifier field of the synonym table.

11. A computer program product for managing memory address synonyms, the computer program product comprising:
a computer readable storage medium and program instructions stored on the computer readable storage medium, the program instructions comprising:
program instructions to establish a bits register for a first virtual address in a memory system, the bits register having synonym fields representing each bit of a first synonym identifier portion of the first virtual address, the first virtual address being mapped to a physical address;
program instructions to determine, for a second virtual address mapped to the physical address, the second virtual address having a second synonym identifier portion, a set of differing bits within the second synonym identifier portion compared to the first synonym identifier portion; and
program instructions to register the set of differing bits in the bits register.

12. The computer program product of claim 11, further comprising:
program instructions to receive a fetch request excluding synonyms from mapping to the physical address; and
program instructions to generate a set of synonyms within the memory system based on the bits register.

13. The computer program product of claim 12, further comprising program instructions to invalidate the set of synonyms within the memory system.

14. The computer program product of claim 12, wherein program instructions to generate the set of synonyms comprises program instructions to generate each binary combination represented by the bits register.

15. The computer program product of claim 11, further comprising program instructions to record the first synonym identifier portion in a first synonym identifier field and the second synonym identifier portion in a second synonym identifier field of a synonym table.

16. A computer system comprising:
one or more computer processors;
one or more computer readable storage media;
program instructions stored on the one or more computer readable storage media for execution by at least one of the one or more processors, the program instructions comprising:
program instructions to establish a bits register for a first virtual address in a memory system, the bits register having synonym fields representing each bit of a first synonym identifier portion of the first virtual address, the first virtual address being mapped to a physical address;
program instructions to determine, for a second virtual address mapped to the physical address, the second virtual address having a second synonym identifier portion, a set of differing bits within the second synonym identifier portion compared to the first synonym identifier portion; and
program instructions to register the set of differing bits in the bits register.

17. The computer system of claim 16, further comprising:
program instructions to receive a fetch request excluding synonyms from mapping to the physical address; and
program instructions to generate a set of synonyms within the memory system based on the bits register.

18. The computer system of claim 17, further comprising program instructions to invalidate the set of synonyms within the memory system.

19. The computer system of claim 17, wherein program instructions to generate the set of synonyms comprises program instructions to generate each binary combination represented by the bits register.

20. The computer system of claim 16, further comprising program instructions to record the first synonym identifier portion in a first synonym identifier field and the second synonym identifier portion in a second synonym identifier field of a synonym table.

* * * * *